Feb. 3, 1953     N. E. SPRECHER     2,627,114
IMPEDANCE RULE
Filed Feb. 3, 1949

Inventor
NOAH E. SPRECHER

By
Attorney

Patented Feb. 3, 1953

2,627,114

UNITED STATES PATENT OFFICE 2,627,114

IMPEDANCE RULE

Noah E. Sprecher, Brooklyn, N. Y.

Application February 3, 1949, Serial No. 74,285

3 Claims. (Cl. 33—76)

(Granted under Title 35, U. S. Code (1952), sec. 266)

The invention described herein may be manufactured and used by or for the Government for governmental purposes without the payment of any royalty thereon.

The present invention relates to an impedance rule and more particularly to a rule for solving impedance problems for electrical circuits and networks.

An object of the present invention is the provision of a rule for rapidly determining the values of circuit elements in both series and parallel circuits.

Another object is to provide a rule for calculating the amplitude and phase angle of the impedance of either series or parallel networks.

A further object is to provide a rule for determining the values of the circuit constants necessary for transforming a resistance from one value to another.

Other objects and many of the attendant advantages of this invention will be readily appreciated as the same become better understood by reference to the following detailed description when considered in connection with the accompanying drawings in which like reference characters designate like parts throughout the figures thereof and wherein.

Figure 1:
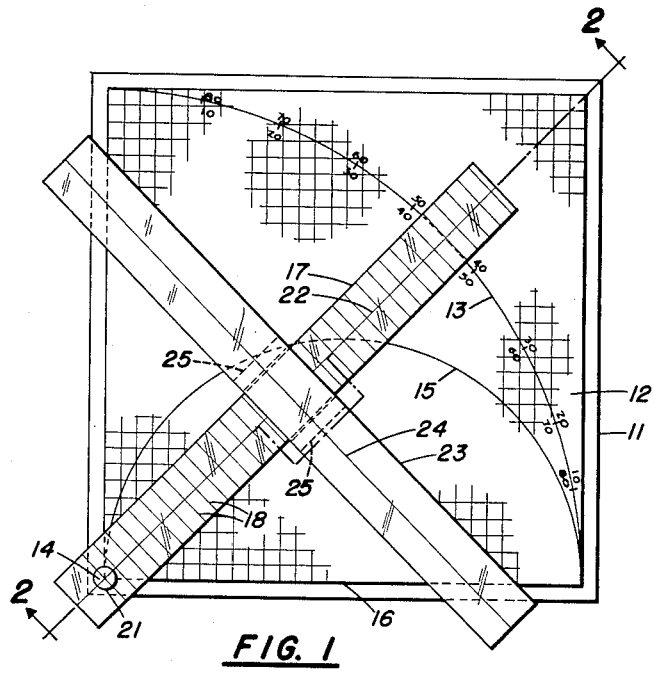
Fig. 1 is a plan view illustrating a preferred embodiment of the impedance rule of the subject invention.

Referring now to the drawings there is shown in Fig. 1 a supporting member 11 made of any suitable durable material and having inscribed or printed thereon a chart 12 of rectilinear coordinates. The chart 12 is preferably square in shape and comprises 100 squares each of which is divided into 100 smaller squares.

Drawn on chart 12 in any suitable manner is an arc 13 of a circle having its center at one corner 14 of the chart and its radius equal to the length of one side of chart 12, the arc 13 being divided into ninety degrees as indicated in Fig. 1. Also drawn on chart 12 is a semicircle 15 having a radius equal to one half the length of one side of chart 12 and its center positioned at the midpoint 16 of said side.

Figure 2:
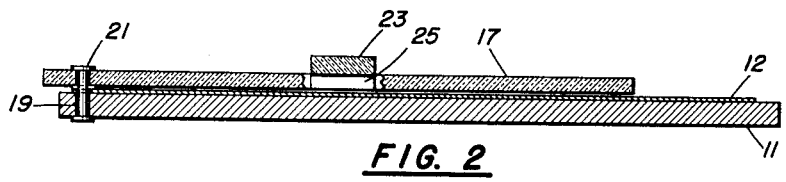
Fig. 2 is a sectional view of the rule taken along the line 2—2 of Fig. 1 looking in the direction of the arrows.

Pivotally mounted on member 11 at corner 14 is a straightedge 17 preferably made of transparent plastic material and having inscribed thereon a series of hairlines 18 spaced apart the same length as the scale on chart 12, and a hairline 22 running along the longitudinal centerline thereof. Straightedge 17 is mounted in a bearing 19, preferably made of metal, by means of pin 21 passing through straightedge 17, bearing 18 and member 11, as clearly shown in Fig. 2.

Slidably mounted on straightedge 17 is a straightedge 23, preferably of transparent plastic material, having a hairline 24 inscribed along the longitudinal centerline thereof. Straightedge 23 is mounted on edge 17 by means of flanges 25, hairline 24 being always aligned at right angles to the longitudinal centerline of straightedge 17.

The rule of the present invention may be used to solve numerous impedance problems in electrical circuits and networks, several of which will be illustrated below.

In solving a series impedance problem, the magnitude of the impedance of a series circuit consisting of resistance $R_s$ and reactance $X_s$ is $$|Z_s| = \sqrt{R_s^2 + X_s^2}$$

The phase angle of the impedance may be designated as $$\tan \theta_s = \frac{X_s}{R_s}$$

Thus, to determine these values on chart 12, the vertical line representing the resistance and the horizontal line representing the reactance are located, and straightedge 17 is swung on its pivot point so that hairline 22 coincides with the intersection of these two lines, the amplitude of the series impedance being then read on straightedge 17. The intersection of hairline 22 with arc 13 on chart 12 indicates the phase angle of the impedance.

In solving a parallel impedance problem, the magnitude of the impedance of a parallel circuit consisting of resistance $R_p$ and reactance $X_p$ is $$|Z_p| = \frac{R_p X_p}{\sqrt{R_p^2 + X_p^2}}$$

The phase angle of the impedance may be designated as $$\tan \theta_p = \frac{R_p}{X_p}$$

Thus, the magnitude of the impedance of the parallel circuit is equal to the altitude of a right triangle having its sides equal to $R_p$ and $X_p$, respectively, and the phase angle is equal to the angle between the hypotenuse of the right triangle and the vertical or the angle between the altitude and the horizontal.

Therefore, to determine the impedance of a resistance and reactance in parallel, slide straightedge 23 along straightedge 17 and at the same time adjust the angle of straightedge 17 until hairline 24 intersects the lower edge of chart 12 at a point equal to the resistance $R_p$ and at the same time intersects the left edge of chart 12 at a point equal to the reactance $X_p$. The point of intersection of hairlines 22 and 24, as measured on straightedge 17, is the altitude of the right triangle and is equal to the magnitude of the impedance $Z_p$, while the intersection of hairline 22 and arc 13 indicates the phase angle.

If it is desired to determine the equivalent series circuit for the parallel circuit above, read down vertically from the parallel impedance point to determine the equivalent series resistance and read horizontally to the left edge of chart 12 to obtain the equivalent series reactance. Similarly, if it is desired to determine the equivalent parallel impedance for the series circuit of the first problem, straightedge 23 is moved along straightedge 17 until hairline 22 and 24 intersect, and the intersections of hairline 24 with the lower and left edges of chart 12 determine the equivalent parallel resistance and reactance, respectively.

By utilizing semicircle 15, the rule may be efficiently used to transform resistances from one effective value to another, this problem being solved on a ratio basis. Thus, the larger resistance is multiplied by some factor so that it may be represented by 10 units on the rule, the smaller resistance being multiplied by this same factor and the resistance values obtained being used on chart 12. The factor by which the original values were altered must be used inversely on all values obtained from the rule to present the final answer.

If it is desired to transform a given resistance to a higher effective resistance, this can be accomplished by connecting an inductive reactance $X_L$ in series with the resistance R and connecting a capacitive reactance $X_c$ in parallel with the series circuit of R and $X_L$. The impedance of the parallel circuit is $$Z = \frac{(R+JX_L)(-JX_c)}{R+J(X_L-X_c)}$$

By multiplying the terms out and clearing the denominator of its imaginary term, the value of the impedance is $$Z = \frac{X_c^2 R + JX_c(X_c X_L - R^2 - X_L^2)}{R^2 + (X_L - X_c)^2} \quad (1)$$

In order that the impedance Z be equal to the effective resistance desired $R_e$, the phase angle $\theta$ must be zero or $$\tan\theta = X_c X_L - R^2 X_L^2 = 0$$

Therefore, $$X_c = \frac{X_L^2 + R^2}{X_L} \quad (2)$$

Substituting this value of $X_c$ in Equation 1 gives $$Z = R_e = \frac{X_L^2 + R^2}{R} = Z_R \sec\alpha$$

where $Z_R$ is the amplitude of the impedance of R and $X_L$ in series and $\alpha$ is the phase angle of said impedance.

Similarly, from Equation 2

$$X_c = Z_R \csc\alpha$$

Figure 3:
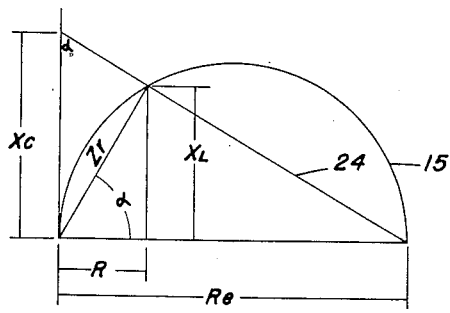
Fig. 3 shows a diagrammatic view of the impedance rule illustrating its operation for resistance transformation.

Referring now to Fig. 3, it is seen that in order for $R_e$ to remain constant at a value 10, as stated above, $R_e$ must equal the value of the diameter of semicircle 15 and the intersection on semicircle 15 of a vertical line from the value of resistance R determines the value of the inductance $X_L$ to be added in series with resistance R. The intersection of hairline 24 with the left edge of chart 12 determines the value of the capacitive reactance $X_c$, as seen in Fig. 3.

To illustrate this operation of the rule, let us assume that it is desired to transform a 2 ohm resistance to a 20 ohm resistance. Dividing 20 and 2 by a factor of 2 results in $R_e$ equal to 10 and R equal to 1. Now lay the hairline 24 of straightedge 23 from 10 on the bottom scale, as shown in Fig. 3, through the intersection of semicircle 15 and the vertical line representing 1 ohm resistance. Reading horizontally from this intersection, the value of the inductive reactance is 3 ohms, and the intersection of hairline 24 with the left edge of chart 12 gives a value of 3⅓ ohms capacitive reactance. Multiplying these values by a factor of 2 gives the final values of 6 ohms inductive reactance in series and 6⅔ ohms capacitive reactance in parallel with the series circuit.

The rule may also be used to transform a high resistance to a lower effective resistance. This may be accomplished by connecting an inductive reactance $X_L$ across the resistance and connecting a capacitive reactance $X_c$ in series with the parallel circuit. Calculations of the equivalent impedance of this circuit results in the following equations:

$$R_e = |Z_p| \cos\alpha$$

and $$X_c = |Z_p| \sec\alpha$$

where $|Z_p|$ equals the magnitude of the impedance of the parallel circuit of resistance R and inductive reactance $X_L$, and $\alpha$ is the phase angle of this impedance.

Therefore, to determine these values on the rule, the rule is set up as in the previous problem with the resistances set up in opposite order, that is the known resistance R along the horizontal axis and the desired equivalent resistance $R_e$ along the vertical axis. The intersection of hairline 24 and the left edge of chart 12 determines the inductive reactance $X_L$, and the horizontal reading from the point of intersection of hairline 24 and semicircle 15 determines the value of the capacitive reactance.

The sine, cosine and tangent of any angle can also be obtained simply by use of this rule. By locating the desired angle on the arc 13 of chart 12 and then taking the horizontal and vertical readings from this point, the sine and cosine, respectively, are obtained. The tangent is found by swinging straightedge 17 to the desired angle and reading the intersection of hairline 22 with the right edge of chart 12. If the reading is off the chart, a ratio of vertical to horizontal readings may be utilized, or the next smaller division is read and the value obtained is multiplied by the proper factor.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. An impedance rule comprising a chart of rectangular coordinates, an arc on said chart having its center at one corner thereof and its radius equal to the length of one side thereof, a semicircle on said chart having its center at the midpoint of the lower horizontal edge thereof and its radius equal to one half the length of said side, said semicircle intersecting the center of said arc, a first straightedge pivotally mounted on said chart at said corner, and a second straightedge slidably mounted on said first straightedge for movement at right angles thereto, and in operative relation to said semicircle.

2. An impedance rule according to claim 1, wherein said first straight edge has a scale inscribed thereon, the divisions of said scale being equal to the divisions of said chart, and wherein said arc is divided into degrees.

3. An impedance rule comprising a substantially flat member, a chart of horizontal and vertical rectilinear coordinates inscribed thereon, an arc inscribed on said member and having its center at the intersection of one of said horizontal and one of said vertical coordinates, said arc intersecting each of said last mentioned horizontal and vertical coordinates, a semicircle inscribed on said member having its midpoint along one of said last mentioned coordinates, said semicircle intersecting said center of said arc, a straightedge pivotally mounted on said member at the center of said arc, and a second straightedge slidably mounted on the first-mentioned straightedge in operative relation to said semicircle and for movement at right angles with respect to said first-mentioned straightedge.

NOAH E. SPRECHER.

REFERENCES CITED

The following references are of record in the file of this patent:

UNITED STATES PATENTS

| Number | Name | Date |
|---|---|---|
| 378,257 | Leschorn | Feb. 21, 1888 |
| 1,133,540 | Dannenberg | Mar. 30, 1915 |
| 1,196,581 | Pilgren | Aug. 29, 1916 |
| 1,201,334 | Nielsen | Oct. 17, 1916 |
| 1,262,023 | Crampton | Apr. 9, 1918 |
| 1,287,219 | Carlson | Dec. 10, 1918 |
| 1,310,547 | Sanborn | July 22, 1919 |
| 2,300,401 | Basler et al. | Nov. 3, 1942 |
| 2,465,481 | Reiche | Mar. 29, 1949 |

FOREIGN PATENTS

| Number | Country | Date |
|---|---|---|
| 755 | England | Jan. 18, 1886 |
| 66,495 | Germany | June 18, 1892 |